United States Patent
Opatz et al.

(10) Patent No.: US 10,876,756 B2
(45) Date of Patent: *Dec. 29, 2020

(54) DISCHARGE AIR RESET FOR A CONSTANT VOLUME AIR CHANGEOVER BYPASS

(71) Applicant: TRANE INTERNATIONAL INC., Davidson, NC (US)

(72) Inventors: Aaron E. Opatz, Maple Grove, MN (US); Ronnie R. Moffitt, Harrodsburg, KY (US); John Arthur Murphy, Onalaska, WI (US); James Kenneth McKeever, Blaine, MN (US); Eugene R. Shedivy, St. Paul, MN (US)

(73) Assignee: TRANE INTERNATIONAL INC., Davidson, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/246,211

(22) Filed: Jan. 11, 2019

(65) Prior Publication Data

US 2020/0208865 A1 Jul. 2, 2020

Related U.S. Application Data

(63) Continuation-in-part of application No. 16/233,931, filed on Dec. 27, 2018.

(51) Int. Cl.
*F24F 11/00* (2018.01)
*G05B 15/02* (2006.01)
(Continued)

(52) U.S. Cl.
CPC .............. *F24F 11/63* (2018.01); *F24F 11/30* (2018.01); *F24F 11/72* (2018.01); *F24F 11/89* (2018.01); *F24F 2110/20* (2018.01)

(58) Field of Classification Search
CPC .. F24F 11/30; F24F 11/63; F24F 11/72; F24F 11/80; F24F 3/0042
See application file for complete search history.

(56) References Cited

U.S. PATENT DOCUMENTS 6,296,193 B1 10/2001 West et al.
6,298,912 B1 * 10/2001 Rayburn .................. F24F 11/76
165/249

(Continued)

OTHER PUBLICATIONS

Extended European Search Report; European Patent Application No. 19217402.7, dated May 29, 2020 (7 pages).

*Primary Examiner* — Mark A Connolly
(74) *Attorney, Agent, or Firm* — Hamre, Schumann, Mueller & Larson, P.C.

(57) ABSTRACT

A method of controlling a discharge air reset in an heating, ventilation, air conditioning, and refrigeration (HVACR system includes determining, by a controller, a space temperature in a conditioned space, a setpoint temperature of the conditioned space, and an operating mode of a variable-air-volume (VAV) box for the conditioned space. The controller determines whether the operating mode of the VAV box matches an operating mode of an HVACR unit. A deviation from the setpoint temperature of the conditioned space for the VAV box for the conditioned is calculated in response to determining the VAV box is in a same mode as the HVACR unit. A statistical deviation from the setpoint temperature of the conditioned space is calculated. A discharge air setpoint temperature is determined based on the statistical deviation from the setpoint temperature of the conditioned space. The controller sets the discharge air setpoint temperature of the HVACR unit using the determined discharge air setpoint temperature.

20 Claims, 5 Drawing Sheets

(51) Int. Cl.
F24F 11/63 (2018.01)
F24F 11/72 (2018.01)
F24F 11/89 (2018.01)
F24F 11/30 (2018.01)
F24F 110/20 (2018.01)

(56) References Cited

U.S. PATENT DOCUMENTS

| | | |
|---|---|---|
| 8,190,273 B1 | 5/2012 | Federspiel et al. |
| 2008/0183424 A1* | 7/2008 | Seem ................. G05B 23/0216 702/181 |
| 2012/0101648 A1* | 4/2012 | Federspiel ......... G05D 23/1934 700/291 |
| 2017/0314796 A1 | 11/2017 | Kuckuk et al. |
| 2019/0323720 A1* | 10/2019 | Challa ..................... F24F 11/62 |

* cited by examiner

DISCHARGE AIR RESET FOR A CONSTANT VOLUME AIR CHANGEOVER BYPASS

FIELD

This disclosure relates generally to a heating, ventilation, air conditioning, and refrigeration (HVACR) system. More specifically, this disclosure relates to a discharge air reset for a constant volume air changeover bypass HVACR system.

BACKGROUND

Buildings are designed with a variety of heating, ventilation, air conditioning, and refrigeration (HVACR) system types. One such HVACR system type includes a rooftop unit (RTU) to provide conditioned air to an air distribution system that includes ductwork, variable air volume (VAV) boxes, and diffusers. The VAV boxes provide a variable amount of conditioned air to a space based on the temperature and ventilation requirements of that space.

SUMMARY

This disclosure relates generally to a heating, ventilation, air conditioning, and refrigeration (HVACR) system. More specifically, this disclosure relates to a discharge air reset for a constant volume air changeover bypass HVACR system.

A method of controlling a discharge air reset in a heating, ventilation, air conditioning, and refrigeration (HVACR) system is disclosed. The method includes determining, by a controller, a space temperature in a conditioned space, a setpoint temperature of the conditioned space, and an operating mode of a variable-air-volume (VAV) box for the conditioned space. A deviation from the setpoint temperature of the conditioned space for the VAV box for the conditioned space is calculated. A statistical deviation from the setpoint temperature of the conditioned space is calculated. A discharge air setpoint temperature is determined based on the statistical deviation from the setpoint temperature of the conditioned space. The controller sets the discharge air setpoint temperature of the HVACR unit using the determined discharge air setpoint temperature.

A heating, ventilation, air conditioning, and refrigeration (HVACR) system is also disclosed. The HVACR system includes an HVACR unit operable in a heating mode and a cooling mode. A conditioned space includes a variable-air-volume (VAV) box and a sensor. A controller is in electronic communication with the HVACR unit, the VAV box, and the sensor. The controller is configured to determine a space temperature in the conditioned space, a setpoint temperature of the conditioned space, and an operating mode of the VAV box for the conditioned space. The controller calculates a deviation from the setpoint temperature of the conditioned space for the VAV box for the conditioned space. The controller calculates a statistical deviation from the setpoint temperature of the conditioned space for the VAV box for the conditioned space. The controller determines a discharge air setpoint temperature based on the statistical deviation from the setpoint temperature of the conditioned space for the VAV box for the conditioned space. The controller sets the discharge air setpoint temperature of the HVACR unit using the determined discharge air setpoint temperature.

In an embodiment, the statistical deviation is an average deviation.

A method of controlling a discharge air reset in a heating, ventilation, air conditioning, and refrigeration (HVACR) system is disclosed. The method includes determining, by a controller, a space temperature in a conditioned space, a setpoint temperature of the conditioned space, and an operating mode of a variable-air-volume (VAV) box for the conditioned space. A deviation from the setpoint temperature of the conditioned space for the VAV box for the conditioned space is calculated. An average deviation from the setpoint temperature of the conditioned space is calculated. A discharge air setpoint temperature is determined based on the average deviation from the setpoint temperature of the conditioned space. The controller sets the discharge air setpoint temperature of the HVACR unit using the determined discharge air setpoint temperature.

A heating, ventilation, air conditioning, and refrigeration (HVACR) system is also disclosed. The HVACR system includes an HVACR unit operable in a heating mode and a cooling mode. A conditioned space includes a variable-air-volume (VAV) box and a sensor. A controller is in electronic communication with the HVACR unit, the VAV box, and the sensor. The controller is configured to determine a space temperature in the conditioned space, a setpoint temperature of the conditioned space, and an operating mode of the VAV box for the conditioned space. The controller calculates a deviation from the setpoint temperature of the conditioned space for the VAV box for the conditioned space. The controller calculates an average deviation from the setpoint temperature of the conditioned space for the VAV box for the conditioned space. The controller determines a discharge air setpoint temperature based on the average deviation from the setpoint temperature of the conditioned space for the VAV box for the conditioned space. The controller sets the discharge air setpoint temperature of the HVACR unit using the determined discharge air setpoint temperature.

In an embodiment, the statistical deviation is a maximum deviation.

A method of controlling a discharge air reset in a heating, ventilation, air conditioning, and refrigeration (HVACR) system is disclosed. The method includes determining, by a controller, a space temperature in a conditioned space, a setpoint temperature of the conditioned space, and an operating mode of a variable-air-volume (VAV) box for the conditioned space. A deviation from the setpoint temperature of the conditioned space for the VAV box for the conditioned space is calculated. A maximum deviation from the setpoint temperature of the conditioned space is calculated. A discharge air setpoint temperature is determined based on the maximum deviation from the setpoint temperature of the conditioned space. The controller sets the discharge air setpoint temperature of the HVACR unit using the determined discharge air setpoint temperature.

A heating, ventilation, air conditioning, and refrigeration (HVACR) system is also disclosed. The HVACR system includes an HVACR unit operable in a heating mode and a cooling mode. A conditioned space includes a variable-air-volume (VAV) box and a sensor. A controller is in electronic communication with the HVACR unit, the VAV box, and the sensor. The controller is configured to determine a space temperature in the conditioned space, a setpoint temperature of the conditioned space, and an operating mode of the VAV box for the conditioned space. The controller calculates a deviation from the setpoint temperature of the conditioned space for the VAV box for the conditioned space. The controller calculates a maximum deviation from the setpoint temperature of the conditioned space for the VAV box for the conditioned space. The controller determines a discharge air setpoint temperature based on the maximum deviation from the setpoint temperature of the conditioned space for the VAV box for the conditioned space. The controller sets the discharge air setpoint temperature of the HVACR unit using the determined discharge air setpoint temperature.

BRIEF DESCRIPTION OF THE DRAWINGS

References are made to the accompanying drawings that form a part of this disclosure, and which illustrate embodiments in which the systems and methods described in this specification can be practiced.

Like reference numbers represent like parts throughout.

DETAILED DESCRIPTION

This disclosure relates generally to a heating, ventilation, air conditioning, and refrigeration (HVACR) system. More specifically, this disclosure relates to a discharge air reset for a constant volume air changeover bypass HVACR system.

Buildings are designed with a variety of HVACR system types. One type of HVACR system includes a rooftop unit to provide conditioned air to an air distribution system that includes ductwork, variable-air-volume (VAV) boxes, and diffusers. The VAV boxes provide a variable amount of conditioned air to a space based on the temperature and ventilation requirements of that space.

Some rooftop units deliver a constant volume of air. These systems are commonly known as changeover bypass systems. With changeover bypass systems, the rooftop unit provides either relatively cold or relatively warm air to the VAV boxes. When the majority of spaces need cooling capability, the rooftop unit operates in the cooling mode—normally providing a default discharge air of 55° F. air to the VAV boxes. When the majority of spaces need heating, the rooftop unit changes to the heating mode—normally providing a default discharge air of 105° F. air to the VAV boxes. Because the rooftop unit is capable of proving only cold or warm air, the system changes between the cooling and heating modes to temporarily satisfy the needs of each space.

Embodiments of this disclosure are directed to modifying a temperature of the discharge air according to a statistical deviation of a space temperature of the conditioned spaces from a setpoint temperature of the conditioned spaces.

A "statistical deviation" of a space temperature of the conditioned spaces from a setpoint temperature of the conditioned spaces, as used in this Specification, is a single measure of an attribute of a sample. In an embodiment, the statistical deviation is an average. In an embodiment, the statistical deviation is a maximum. In an embodiment, the statistical deviation may include a mean, mode, and/or median, or the like.

Embodiments of this disclosure are directed to modifying a temperature of the discharge air according to an average deviation of a space temperature of the conditioned spaces from a setpoint temperature of the conditioned spaces. The modified discharge air temperature can, for example, enable the rooftop unit to input less energy in heating or cooling the airflow when the cooling or heating loads are relatively lower (as determined by the average deviation).

In an embodiment, utilizing the maximum deviation of the space temperature of the conditioned spaces from the setpoint temperature of the conditioned spaces can result in a more responsive control of the space temperature in the conditioned spaces. That is, the control can result in a more precise climate control for the HVACR system by enabling a faster response to outlier conditions (e.g., conditioned spaces which are not at the setpoint temperature).

Figure 1:
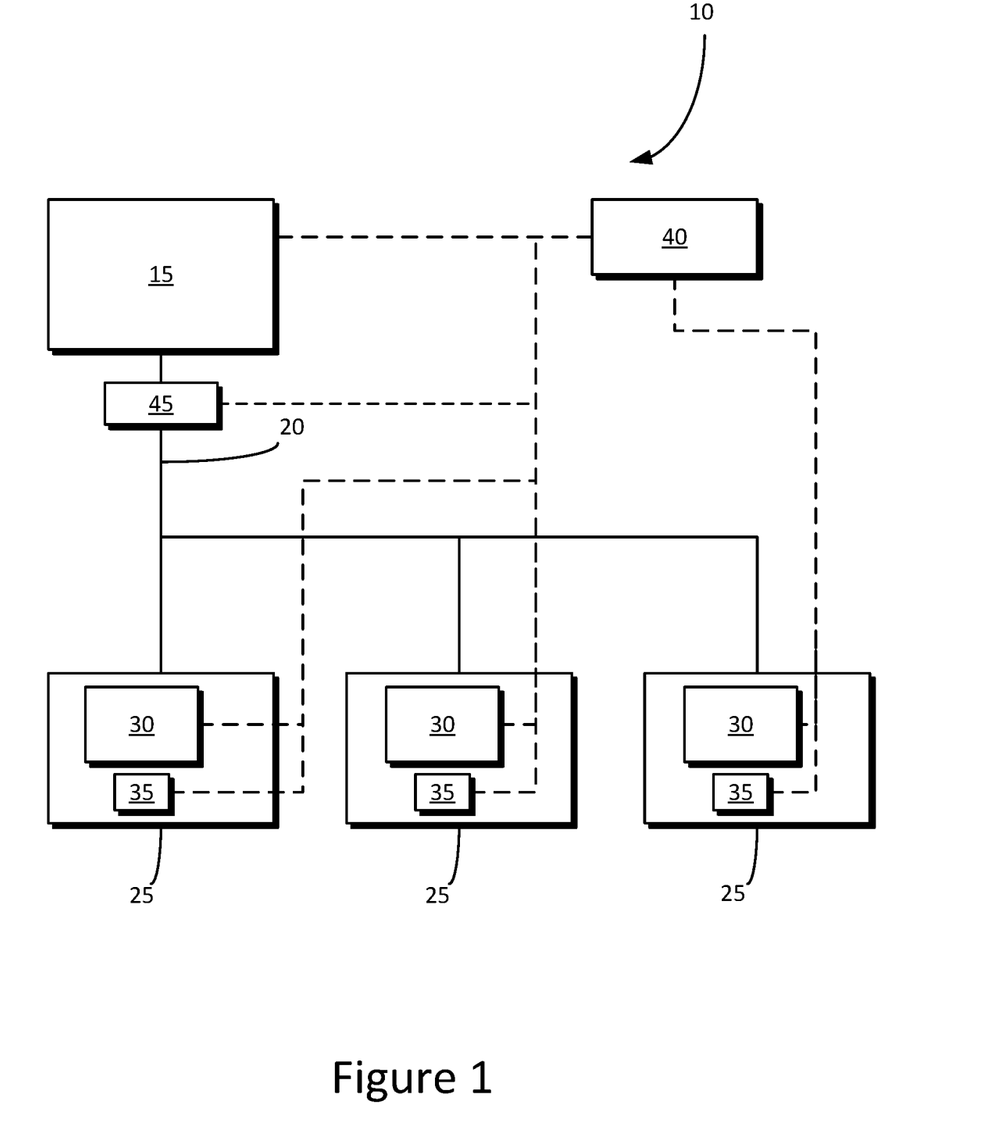
FIG. 1 is a schematic of a heating, ventilation, air conditioning, and refrigeration (HVACR) system, according to an embodiment.

FIG. 1 is a schematic of an HVACR system 10, according to an embodiment. The HVACR system 10 is generally representative of a constant volume changeover bypass HVACR system.

The HVACR system 10 includes an HVACR unit 15. In an embodiment, the HVACR unit 15 may be a rooftop unit. The HVACR unit 15 generally includes a refrigeration circuit (not shown) including a compressor, condenser, expander, and evaporator fluidly connected. The refrigeration circuit operates according to generally known principles to condition an airflow output from the HVACR unit 15. The conditioned airflow can have, for example, a controlled temperature, humidity, or the like.

In an embodiment, the HVACR unit 15 may be able to output an airflow at various temperatures. The HVACR unit 15 can be operable in a cooling mode and in a heating mode. In the cooling mode, the airflow can be conditioned to provide a relatively cooler temperature to the airflow than the heating mode. Similarly, in the heating mode, the airflow can be conditioned to provide a relatively warmer temperature to the airflow than the cooling mode.

In an embodiment, the HVACR unit 15 may be able to output an airflow that is at or about 55° F. in the cooling mode. In an embodiment, the HVACR unit 15 may be able to output an airflow that is relatively cooler than at or about 55° F. or relatively warmer than at or about 55° F. when in the cooling mode. For example, the HVACR unit 15 may be able to output an airflow that is from at or about 45° F. to at or about 65° F. It is to be appreciated that these numbers are examples and that the actual capabilities can vary beyond the stated temperatures.

In an embodiment, the HVACR unit 15 may be able to output an airflow that is at or about 105° F. in the heating mode. In an embodiment, the HVACR unit 15 may be able to output an airflow that is relatively cooler than at or about 105° F. or relatively warmer than at or about 105° F. when in the heating mode. For example, the HVACR unit 15 may be able to output an airflow that is from at or about 80° F. to at or about 115° F. It is to be appreciated that these numbers are examples and that the actual capabilities can vary beyond the stated temperatures.

The HVACR unit 15 provides the conditioned air via ductwork 20 to a plurality of conditioned spaces 25. The conditioned spaces 25 can alternatively be referred to as the zones 25 or the like.

Each of the plurality of conditioned spaces 25 includes a variable air volume (VAV) box 30 and a sensor 35. The VAV box 30 can be selectively controlled for each space to meet an environmental requirement. In an embodiment, the environmental requirement can be, for example, a temperature setpoint. The VAV box 30 can include a damper that can be modulated in response to a measurement from the sensor 35 that is indicative of whether the environment in the conditioned space 25 is meeting the environmental requirement. The damper can control an amount of the conditioned airflow that is provided to the conditioned spaces 25.

When one of the conditioned spaces 25 requires cooling and the HVACR unit 15 is in the cooling mode, the VAV box 30 for that space modulates to deliver more or less conditioned air to the space 25 to control the temperature. In an embodiment, each VAV box 30 can have a minimum airflow requirement to provide proper ventilation to the conditioned space 25. When one of the conditioned spaces 25 requires cooling from the HVACR unit 15 but the HVACR unit 15 is in the heating mode, the VAV box 30 is controlled to reduce the airflow to the minimum flow that meets the ventilation requirement. The signal to the controller 40 requesting cooling from the corresponding VAV box 30 can be counted. Once a majority of the VAV boxes 30 are calling for cooling, the controller 40 can switch the mode of the HVACR unit 15.

Controller 40 can control the HVACR unit 15 as well as the VAV boxes 30. The controller 40 is in electronic communication with the HVACR unit 15, the VAV boxes 30, and the sensors 35. For illustrative purposes, these electronic connections are illustrated in dashed lines. It is to be appreciated that the electronic communication between the various components can be through a wired or a wireless connection.

The HVACR unit 15 may deliver a relatively constant volume of air through the ductwork 20. To balance a volume of air delivered to the conditioned spaces 25, a bypass damper 45 can be included at a location that is downstream of the HVACR unit 15 and upstream of the conditioned spaces 25.

In operation, the HVACR unit 15 either operates in the cooling mode to provide relatively cool air to the conditioned spaces 25 or in the heating mode to provide relatively warmer air to the conditioned spaces 25. The controller 40 can selectively switch the HVACR unit 15 between the cooling mode and the heating mode based on what a majority of the conditioned spaces 25 require. As a result, the HVACR unit 15 can cycle back-and-forth between the heating mode and the cooling mode depending upon the needs of the conditioned spaces. The constant switching can be relatively inefficient. The control methods described in FIGS. 2 and 3 below can adjust a discharge air temperature of the HVACR unit 15 from a default discharge air temperature (e.g., 55° F. or 105° F. or the like) to reduce an amount of cycling of the modes of the HVACR unit 15. In an embodiment, this can reduce an amount of energy consumed by the HVACR unit 15.

Figure 2:
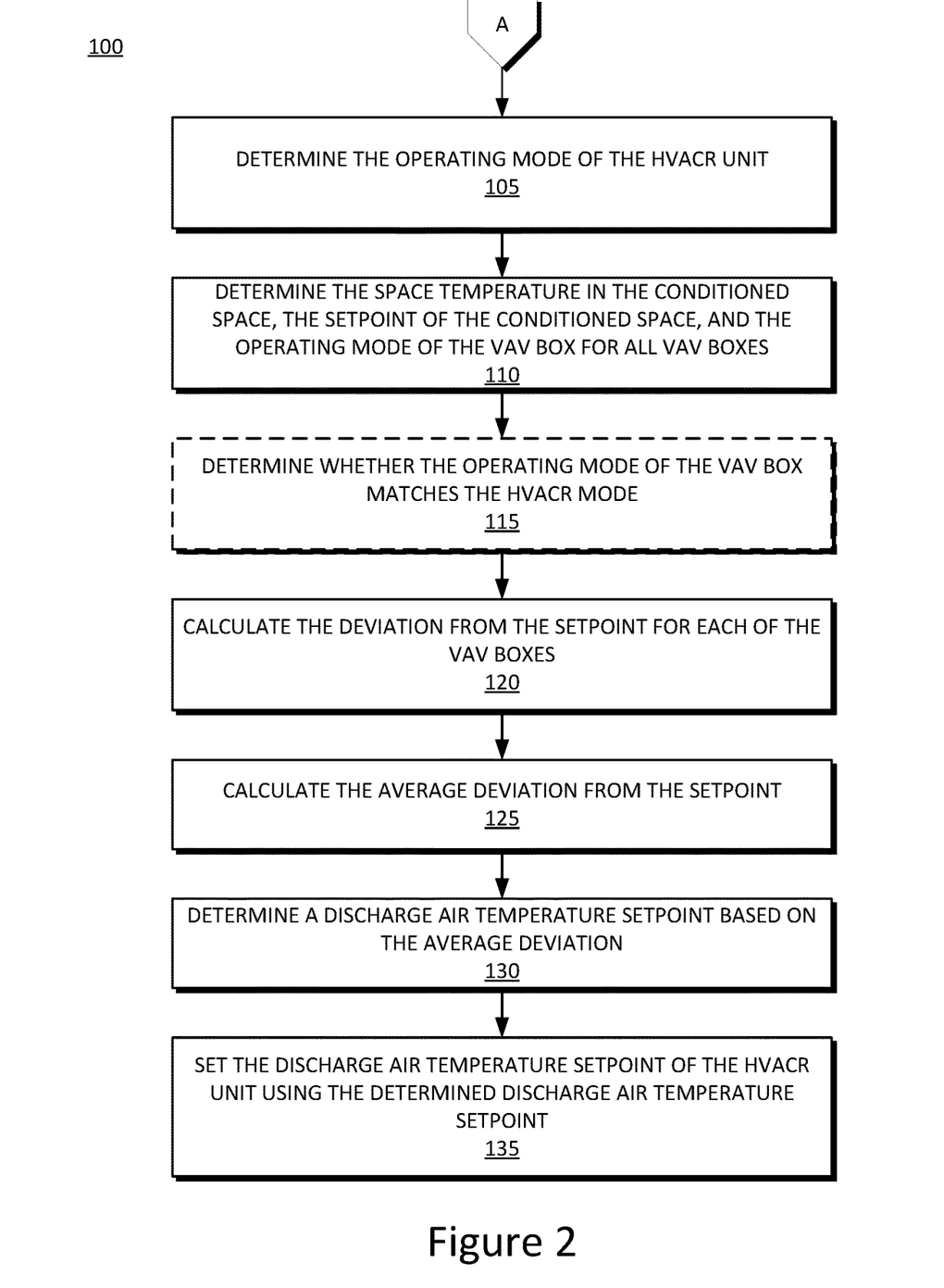
FIG. 2 is a flowchart of a method for resetting a discharge air setpoint temperature in an HVACR system, according to an embodiment.

FIG. 2 is a flowchart of a method 100 for resetting a discharge air setpoint temperature in an HVACR system (e.g., the HVACR system 10 in FIG. 1), according to an embodiment. The method 100 includes determining a statistical deviation from a setpoint temperature for a plurality of VAV boxes and using the statistical deviation to determine a discharge air setpoint temperature for the conditioned air being provided by an HVACR unit. In the method 100, the statistical deviation includes an average deviation. It is to be appreciated that the statistical deviation can, in an embodiment, utilize a maximum deviation (e.g., FIGS. 4, 5) or the like.

The method 100 generally includes determining an average deviation from a setpoint temperature for a plurality of VAV boxes (e.g., the VAV boxes 30 in FIG. 1) and using the average deviation to determine a discharge air setpoint temperature for the conditioned air being provided by an HVACR unit (e.g., the HVACR unit 15 in FIG. 1) in the HVACR system 10. In an embodiment, the method 100 can be performed whenever the HVACR system 10 is operational. In an embodiment, the method 100 can be a mode of operation that can be scheduled or otherwise selectively performed. For example, a building operator may be able to define one or more rules regarding when to perform the method 100 (e.g., during occupied times, unoccupied times, or the like).

In an embodiment, the method 100 can allow the discharge air setpoint temperature of the HVACR unit 15 to vary so that, for example, an amount of switching between a cooling mode and a heating mode of the HVACR unit 15 is reduced. In an embodiment, allowing the discharge air setpoint temperature to vary can also reduce an amount of energy consumed by the HVACR unit 15 in providing the conditioned air to conditioned spaces (e.g., conditioned spaces 25 in FIG. 1) of a building.

At 105, a controller (e.g., the controller 40 in FIG. 1) of the HVACR system 10 determines an operating mode of the HVACR unit 15. The operating mode of the HVACR unit 15 can include a heating mode or a cooling mode. In operation, the cooling mode can result in provision of air at a default discharge air setpoint temperature of at or about 55° F., for example. The heating mode can result in provision of air at a default discharge air setpoint temperature of at or about 105° F., for example.

At 110, the controller 40 determines a space temperature in the conditioned spaces 25 of the HVACR system 10, a setpoint temperature of the conditioned spaces 25, and an operating mode of the VAV boxes 30 in the conditioned spaces 25.

At 110, the controller 40 may determine the space temperature, the setpoint temperature of the conditioned space, and the operating mode for all VAV boxes 30 and corresponding conditioned spaces 25 being controlled by the HVACR system 10. In response to 110, the controller 40 may have the setpoint temperature of the conditioned space, operating mode, and space temperature for every VAV box in the HVACR system 10.

At 115, the controller 40 determines whether the operating mode determined at 110 of the VAV boxes 30 matches the operating mode of the HVACR unit 15 as determined at 105. In the illustrated embodiment, 115 is shown in dashed lines as being optional.

At 120, the controller 40 calculates a deviation from the setpoint temperature for the VAV boxes 30. In an embodiment in which 115 is performed, the method 100 may include calculating the deviation from the setpoint temperature only for those VAV boxes 30 which have the same operating mode as the operating mode of the HVACR unit 15. In such an embodiment, if, at 115, the operating mode for a particular VAV box 30 does not match the operating mode for the HVACR unit 15, the information surrounding setpoint temperature and space temperature for the corresponding conditioned space 25 is considered to be irrelevant to the discharge air temperature reset for the current mode.

In an embodiment, at 120, the controller 40 may calculate a deviation from the setpoint temperature for all VAV boxes 30, regardless of the operating mode. Such an embodiment may, for example, occur when 115 is not performed.

While these VAV boxes 30 may be ignored for purposes of the discharge air setpoint temperature determination, if a majority of the VAV boxes 30 have an operating mode that does not match the operating mode of the HVACR unit 15, then the operating mode of the HVACR unit 15 may be accordingly switched.

In general, a deviation from the setpoint for each of the VAV boxes 30 includes calculating a difference between the setpoint temperature as determined at 110 and the space temperature in the conditioned space 25 as determined at 110.

At 125, the controller 40 calculates an average deviation from the setpoint temperature based on the deviation from the setpoint temperature for the VAV boxes collectively. In an embodiment, this will include averaging (e.g., finding a mean) the deviation from the setpoint temperature for each of the VAV boxes 30 as determined at 120. In an embodiment, the control could be based on a different statistical deviation determination, such as a maximum, a median, or a mode of the collective deviations from the setpoint temperature.

At 130, the controller determines a discharge air setpoint temperature based on the average deviation from the setpoint temperature as determined at 125. In an embodiment, the discharge air setpoint temperature can be determined based on a relationship established between the average deviation and a range of discharge air setpoint temperatures. For example, a discharge air temperature variation range can be set to be from at or about 55° F. to at or about 75° F. when operating in the cooling mode and from at or about 105° F. to at or about 80° F. when operating in the heating mode.

In the cooling mode, a relationship can be drawn such that at an average deviation from the setpoint temperature of at or about −1° F. the discharge air setpoint temperature may be selected to be a modified discharge air setpoint temperature of at or about 75° F. and at an average deviation from the setpoint temperature of at or about 3° F. the discharge air setpoint temperature may be selected to be the default discharge air setpoint temperature of at or about 55° F. In an embodiment, between at or about −1° F. and at or about 3° F., the discharge temperature setpoint can vary linearly between at or about 75° F. and at or about 55° F. In an embodiment, between at or about −1° F. and at or about 3° F., the discharge temperature setpoint can vary according to a non-linear relationship between at or about 75° F. and at or about 55° F.

In an embodiment, a positive deviation from the setpoint temperature can be representative of a situation in which the space temperature is above the setpoint temperature when in the cooling mode. In an embodiment, a positive deviation from the setpoint temperature can be representative of a situation in which the space temperature is below the setpoint temperature when in the heating mode.

In an embodiment, a negative deviation from the setpoint temperature can be representative of a situation in which the space temperature is below the setpoint temperature when in the cooling mode. In an embodiment, a negative deviation from the setpoint temperature can be representative of a situation in which the space temperature is above the setpoint temperature when in the heating mode.

In an embodiment, negative deviations from the setpoint may be ignored. In such an embodiment, a discharge air setpoint temperature may be reset prior to the setpoint temperature being reached. In an embodiment in which negative deviations from the setpoint temperature are enabled, a relatively greater emphasis may be placed on maintaining setpoint control until the setpoint temperature is reached.

In the heating mode, a relationship can be drawn such that at an average deviation from the setpoint temperature of at or about −1° F. the discharge air setpoint temperature may be selected to be a modified discharge air setpoint temperature of at or about 80° F. and at an average deviation from the setpoint temperature of at or about 3° F. the discharge air setpoint temperature may be selected to be a default discharge air setpoint temperature of at or about 105° F. In an embodiment, between at or about −1° F. and at or about 3° F., the discharge air setpoint temperature can vary linearly between at or about 80° F. and at or about 105° F. In an embodiment, between at or about −1° F. and at or about 3° F., the discharge air setpoint temperature can vary according to a non-linear relationship between at or about 80° F. and at or about 105° F.

At 135, the controller 40 sets the discharge air setpoint temperature of the HVACR unit 15 using the discharge temperature setpoint as determined at 130.

Figure 3:
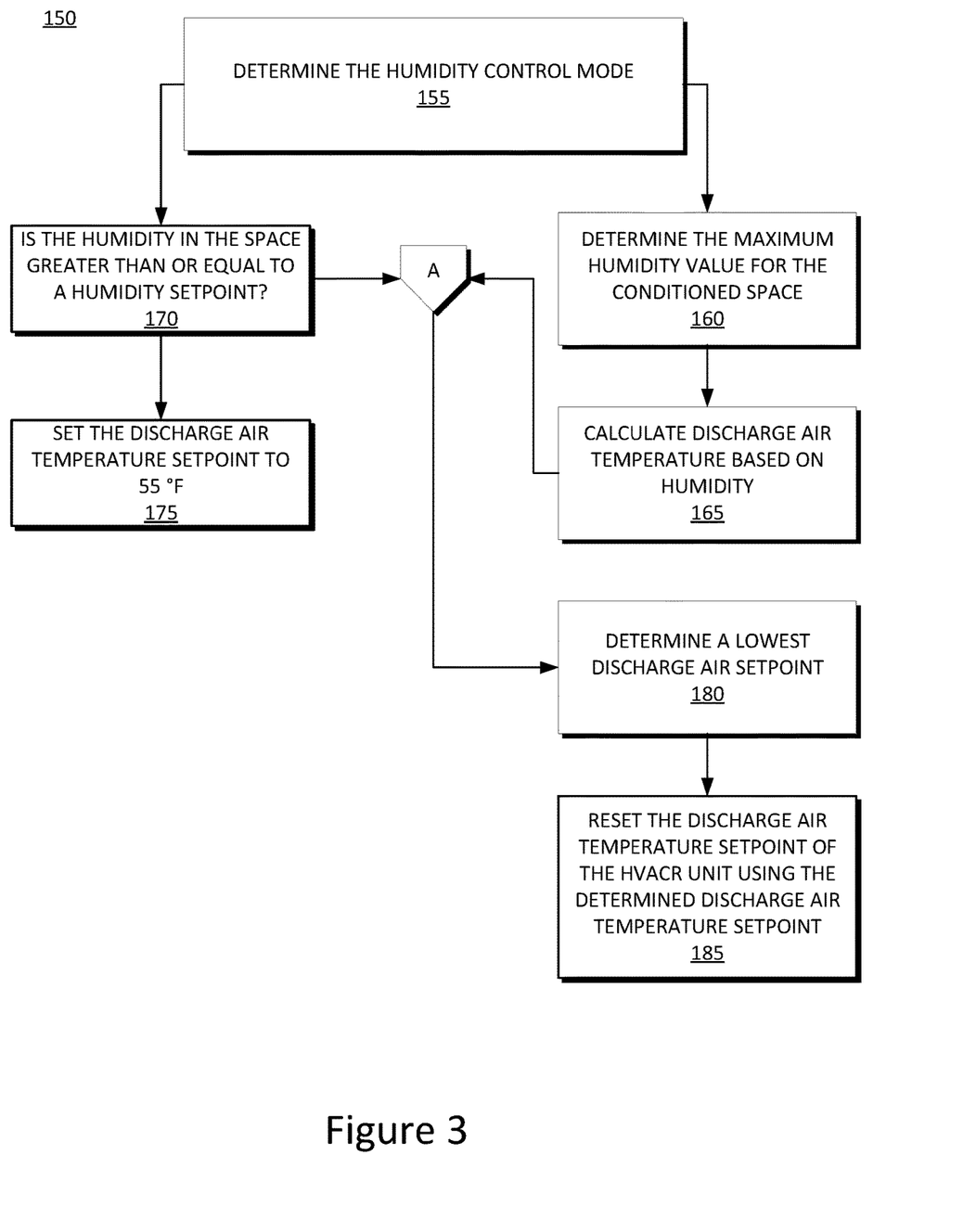
FIG. 3 is a flowchart of a method for resetting a discharge air setpoint temperature in an HVACR system, according to an embodiment.

FIG. 3 is a flowchart of a method 150 for resetting a discharge air setpoint temperature in an HVACR system (e.g., the HVACR system 10 in FIG. 1), according to an embodiment.

The method 150 in FIG. 3 can include one or more additional aspects relative to the method 100 in FIG. 2. The method 150 can include performing the method 100. In an embodiment, the method 150 can generally include a humidity management consideration on top of the discharge air setpoint temperature modification in the method 100. The humidity management operation may maintain conditioned spaces (e.g., the conditioned spaces 25 in FIG. 1) at a particular humidity level. Accordingly, the method 150 may balance the discharge air reset method 100 in FIG. 2 with a humidity control consideration.

At 155, a controller (e.g., the controller 40 in FIG. 1) of the HVACR system 10 determines a humidity control mode. In an embodiment, there can be multiple humidity control modes. For example, in a first humidity control mode (an active mode), the humidity can be maintained at or below a setpoint humidity as determined from a sensor (e.g., the sensor 35 in the conditioned space 25). In another mode (a passive mode), the humidity can be controlled based on limiting according to a temperature of the airflow being provided to the conditioned space 25. Such an embodiment may be considered a passive humidity control, as the discharge air setpoint temperature is limited based on humidity regardless of a measured humidity in the conditioned space.

If the humidity control mode is passive, then at 160 the controller 40 determines a maximum humidity value for the conditioned space 25. The maximum humidity value can be, for example, based on a setting of the user, a standard, or the like.

At 165, the controller 40 determines a discharge air setpoint temperature based on the maximum humidity value. The method 150 can then proceed to performing the method 100 to determine a discharge air setpoint temperature based on the average deviation from the setpoint temperature as discussed above with respect to the method 100 in FIG. 2.

At 180, the controller 40 can compare a discharge air setpoint temperature with the humidity based temperature setpoint as determined at 165. The controller 40 selects a lower threshold of or selects a lowest discharge air setpoint temperature based on these two setpoints, and sets the discharge air setpoint temperature of the HVACR unit 15 to the lower threshold or lowest as selected at 180. At 185, the controller 40 resets the discharge air setpoint temperature of the HVACR unit 15 using the discharge temperature setpoint as determined at 180.

If the humidity control is operating in the active mode, at 170 the controller 40 determines whether the humidity in the conditioned space 25 is equal to or exceeds a humidity setpoint. If yes, then the discharge air setpoint temperature at 175 is maintained at the default discharge air setpoint temperature (e.g., at 55° F.) until the humidity requirement is met. If the humidity is below the humidity setpoint, then the method continues with the discharge air setpoint temperature determination of the method 100 (as described with respect to FIG. 2 above).

Figure 4:
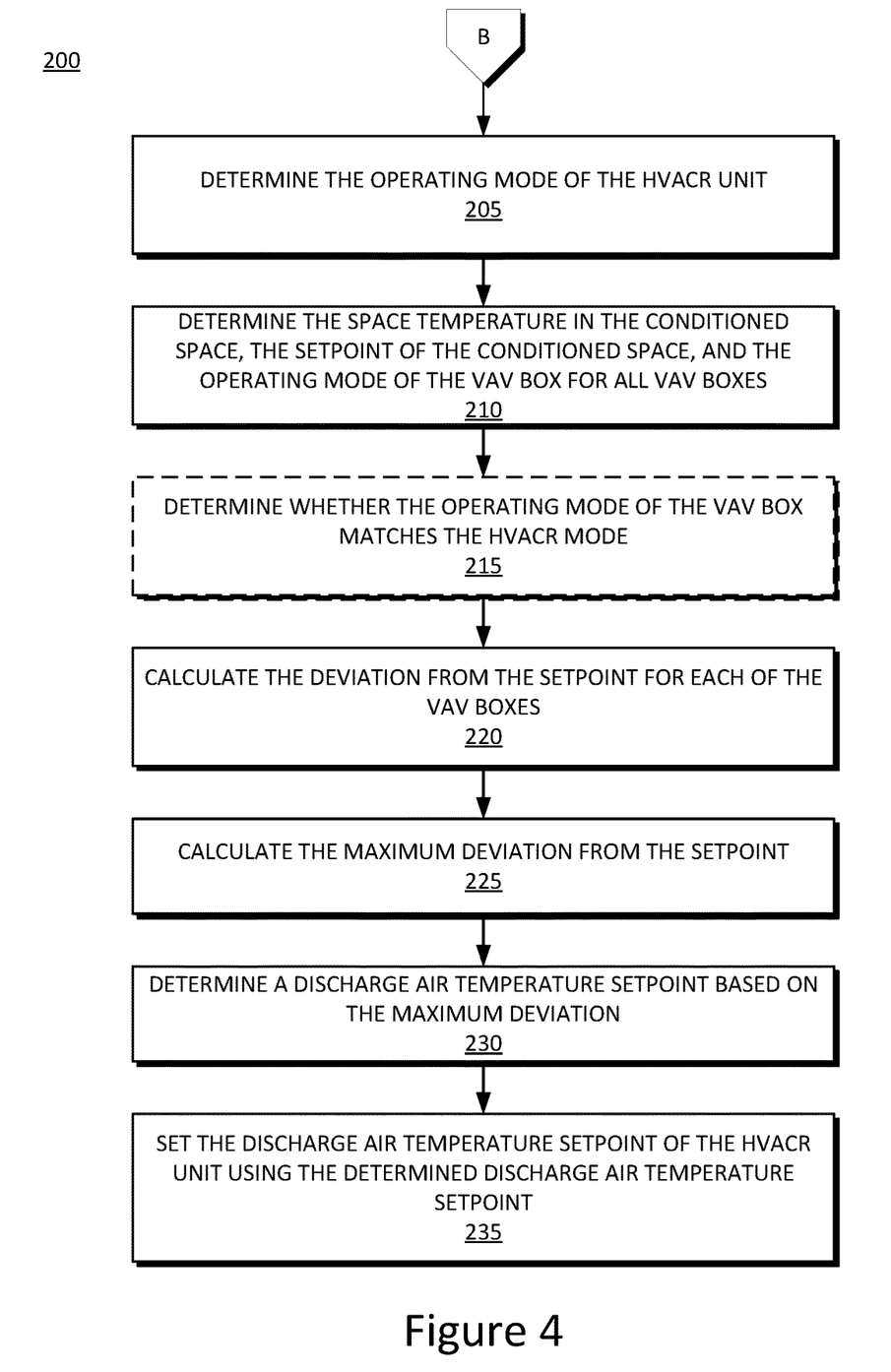
FIG. 4 is a flowchart of a method for resetting a discharge air setpoint temperature in an HVACR system, according to an embodiment.

FIG. 4 is a flowchart of a method 200 for resetting a discharge air setpoint temperature in an HVACR system (e.g., the HVACR system 10 in FIG. 1), according to an embodiment. The method 200 includes determining a statistical deviation from a setpoint temperature for a plurality of VAV boxes and using the statistical deviation to determine a discharge air setpoint temperature for the conditioned air being provided by an HVACR unit. In the method 200, the statistical deviation includes a maximum deviation. It is to be appreciated that the statistical deviation can, in an embodiment, utilize an average deviation (e.g., FIGS. 2, 3) or the like.

The method 200 generally includes determining a maximum deviation from a setpoint temperature for a plurality of VAV boxes (e.g., the VAV boxes 30 in FIG. 1) and using the maximum deviation to determine a discharge air setpoint temperature for the conditioned air being provided by an HVACR unit (e.g., the HVACR unit 15 in FIG. 1) in the HVACR system 10. In an embodiment, the method 200 can be performed whenever the HVACR system 10 is operational. In an embodiment, the method 200 can be a mode of operation that can be scheduled or otherwise selectively performed. For example, a building operator may be able to define one or more rules regarding when to perform the method 200 (e.g., during occupied times, unoccupied times, or the like).

In an embodiment, the method 200 can allow the discharge air setpoint temperature of the HVACR unit 15 to vary so that, for example, an amount of switching between a cooling mode and a heating mode of the HVACR unit 15 is reduced. In an embodiment, allowing the discharge air setpoint temperature to vary can also reduce an amount of energy consumed by the HVACR unit 15 in providing the conditioned air to conditioned spaces (e.g., conditioned spaces 25 in FIG. 1) of a building.

At 205, a controller (e.g., the controller 40 in FIG. 1) of the HVACR system 10 determines an operating mode of the HVACR unit 15. The operating mode of the HVACR unit 15 can include a heating mode or a cooling mode. In operation, the cooling mode can result in provision of air at a default discharge air setpoint temperature of at or about 55° F., for example. The heating mode can result in provision of air at a default discharge air setpoint temperature of at or about 205° F., for example.

At 210, the controller 40 determines a space temperature in the conditioned spaces 25 of the HVACR system 10, a setpoint temperature of the conditioned spaces 25, and an operating mode of the VAV boxes 30 in the conditioned spaces 25.

At 210, the controller 40 may determine the space temperature, the setpoint temperature of the conditioned space, and the operating mode for all VAV boxes 30 and corresponding conditioned spaces 25 being controlled by the HVACR system 10. In response to 210, the controller 40 may have the setpoint temperature of the conditioned space, operating mode, and space temperature for every VAV box in the HVACR system 10.

At 215, the controller 40 determines whether the operating mode determined at 210 of the VAV boxes 30 matches the operating mode of the HVACR unit 15 as determined at 205. In the illustrated embodiment, 215 is shown in dashed lines as being optional.

At 220, the controller 40 calculates a deviation from the setpoint temperature for the VAV boxes 30. In an embodiment in which 215 is performed, the method 200 may include calculating the deviation from the setpoint temperature only for those VAV boxes 30 which have the same operating mode as the operating mode of the HVACR unit 15. In such an embodiment, if, at 215, the operating mode for a particular VAV box 30 does not match the operating mode for the HVACR unit 15, the information surrounding setpoint temperature and space temperature for the corresponding conditioned space 25 is considered to be irrelevant to the discharge air temperature reset for the current mode.

In an embodiment, at 220, the controller 40 may calculate a deviation from the setpoint temperature for all VAV boxes 30, regardless of the operating mode. Such an embodiment may, for example, occur when 215 is not performed.

While these VAV boxes 30 may be ignored for purposes of the discharge air setpoint temperature determination, if a majority of the VAV boxes 30 have an operating mode that does not match the operating mode of the HVACR unit 15, then the operating mode of the HVACR unit 15 may be accordingly switched.

In general, a deviation from the setpoint for each of the VAV boxes 30 includes calculating a difference between the setpoint temperature as determined at 210 and the space temperature in the conditioned space 25 as determined at 210.

At 225, the controller 40 calculates a maximum deviation from the setpoint temperature based on the deviation from the setpoint temperature for the VAV boxes collectively. In an embodiment, this will include identifying the relatively largest deviation from the setpoint temperature among the VAV boxes 30 as determined at 220. In an embodiment, the control could be based on a different statistical determination, such as an average (e.g., mean), median, a mode, or the like of the collective deviations from the setpoint temperature.

At 230, the controller determines a discharge air setpoint temperature based on the maximum deviation from the setpoint temperature as determined at 225. In an embodiment, the discharge air setpoint temperature can be determined based on a relationship established between the maximum deviation and a range of discharge air setpoint temperatures. For example, a discharge air temperature variation range can be set to be from at or about 55° F. to at or about 75° F. when operating in the cooling mode and from at or about 205° F. to at or about 80° F. when operating in the heating mode.

In the cooling mode, a relationship can be drawn such that at a maximum deviation from the setpoint temperature of at or about −1° F. the discharge air setpoint temperature may be selected to be a modified discharge air setpoint temperature of at or about 75° F. and at a maximum deviation from the setpoint temperature of at or about 3° F. the discharge air setpoint temperature may be selected to be the default discharge air setpoint temperature of at or about 55° F. In an embodiment, between at or about −1° F. and at or about 3° F., the discharge temperature setpoint can vary linearly between at or about 75° F. and at or about 55° F. In an embodiment, between at or about −1° F. and at or about 3° F., the discharge temperature setpoint can vary according to a non-linear relationship between at or about 75° F. and at or about 55° F.

In an embodiment, a positive deviation from the setpoint temperature can be representative of a situation in which the space temperature is above the setpoint temperature when in the cooling mode. In an embodiment, a positive deviation from the setpoint temperature can be representative of a situation in which the space temperature is below the setpoint temperature when in the heating mode.

In an embodiment, a negative deviation from the setpoint temperature can be representative of a situation in which the space temperature is below the setpoint temperature when in the cooling mode. In an embodiment, a negative deviation from the setpoint temperature can be representative of a situation in which the space temperature is above the setpoint temperature when in the heating mode.

In an embodiment, negative deviations from the setpoint may be ignored. In such an embodiment, a discharge air setpoint temperature may be reset prior to the setpoint temperature being reached. In an embodiment in which negative deviations from the setpoint temperature are enabled, a relatively greater emphasis may be placed on maintaining setpoint control until the setpoint temperature is reached.

In the heating mode, a relationship can be drawn such that at a maximum deviation from the setpoint temperature of at or about −1° F. the discharge air setpoint temperature may be selected to be a modified discharge air setpoint temperature of at or about 80° F. and at a maximum deviation from the setpoint temperature of at or about 3° F. the discharge air setpoint temperature may be selected to be a default discharge air setpoint temperature of at or about 205° F. In an embodiment, between at or about −1° F. and at or about 3° F., the discharge air setpoint temperature can vary linearly between at or about 80° F. and at or about 205° F. In an embodiment, between at or about −1° F. and at or about 3° F., the discharge air setpoint temperature can vary according to a non-linear relationship between at or about 80° F. and at or about 205° F.

At 235, the controller 40 sets the discharge air setpoint temperature of the HVACR unit 15 using the discharge temperature setpoint as determined at 230.

Figure 5:
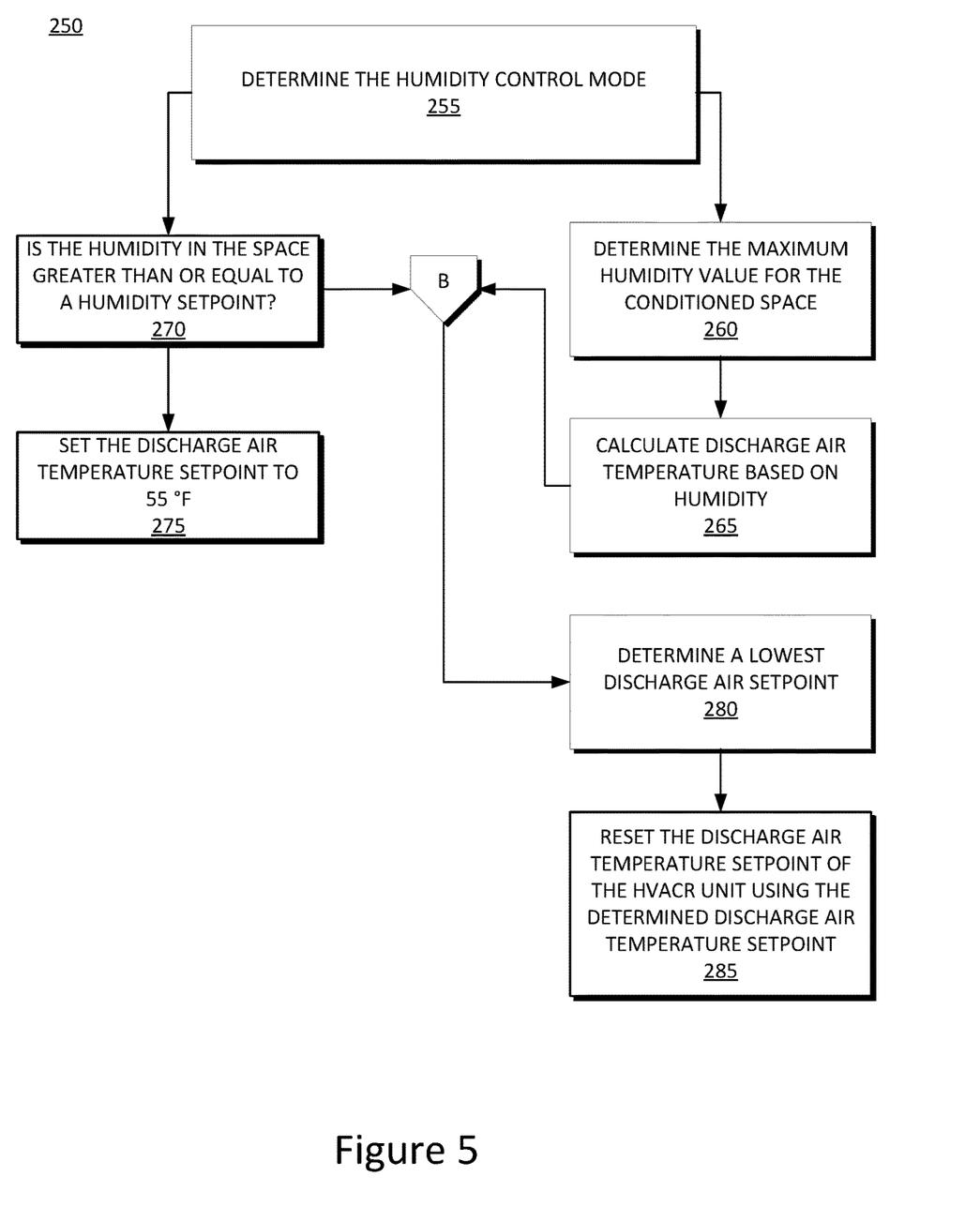
FIG. 5 is a flowchart of a method for resetting a discharge air setpoint temperature in an HVACR system, according to an embodiment.

FIG. 5 is a flowchart of a method 250 for resetting a discharge air setpoint temperature in an HVACR system (e.g., the HVACR system 10 in FIG. 1), according to an embodiment.

The method 250 in FIG. 5 can include one or more additional aspects relative to the method 200 in FIG. 4. The method 250 can include performing the method 200. In an embodiment, the method 250 can generally include a humidity management consideration on top of the discharge air setpoint temperature modification in the method 200. The humidity management operation may maintain conditioned spaces (e.g., the conditioned spaces 25 in FIG. 1) at a particular humidity level. Accordingly, the method 250 may balance the discharge air reset method 200 in FIG. 4 with a humidity control consideration.

At 255, a controller (e.g., the controller 40 in FIG. 1) of the HVACR system 10 determines a humidity control mode. In an embodiment, there can be multiple humidity control modes. For example, in a first humidity control mode (an active mode), the humidity can be maintained at or below a setpoint humidity as determined from a sensor (e.g., the sensor 35 in the conditioned space 25). In another mode (a passive mode), the humidity can be controlled based on limiting according to a temperature of the airflow being provided to the conditioned space 25. Such an embodiment may be considered a passive humidity control, as the discharge air setpoint temperature is limited based on humidity regardless of a measured humidity in the conditioned space.

If the humidity control mode is passive, then at 260 the controller 40 determines a maximum humidity value for the conditioned space 25. The maximum humidity value can be, for example, based on a setting of the user, a standard, or the like.

At 265, the controller 40 determines a discharge air setpoint temperature based on the maximum humidity value. The method 250 can then proceed to performing the method 200 to determine a discharge air setpoint temperature based on the maximum deviation from the setpoint temperature as discussed above with respect to the method 200 in FIG. 4.

At 280, the controller 40 can compare a discharge air setpoint temperature with the humidity based temperature setpoint as determined at 265. The controller 40 selects a lower threshold of or selects a lowest discharge air setpoint temperature based on these two setpoints, and sets the discharge air setpoint temperature of the HVACR unit 15 to the lower threshold or lowest as selected at 280. At 285, the controller 40 resets the discharge air setpoint temperature of the HVACR unit 15 using the discharge temperature setpoint as determined at 280.

If the humidity control is operating in the active mode, at 270 the controller 40 determines whether the humidity in the conditioned space 25 is equal to or exceeds a humidity setpoint. If yes, then the discharge air setpoint temperature at 275 is maintained at the default discharge air setpoint temperature (e.g., at 55° F.) until the humidity requirement is met. If the humidity is below the humidity setpoint, then the method continues with the discharge air setpoint temperature determination of the method 200 (as described with respect to FIG. 4 above).

Aspects

It is noted that any one of aspects 1-10 can be combined with any one of aspects 11-20, 21-30, 31-40, 41-50, or 51-60. Any one of aspects 11-20 can be combined with any one of aspects 21-30, 31-40, 41-50, or 51-60. Any one of aspects 21-30 can be combined with any one of aspects 31-40, 41-50, or 51-60. Any one of aspects 31-40 can be combined with any one of aspects 41-50 or 51-60. Any one of aspects 41-50 can be combined with any one of aspects 51-60.

Aspect 1. A method of controlling a discharge air reset in a heating, ventilation, air conditioning, and refrigeration (HVACR) system, comprising: determining, by a controller, a space temperature in a conditioned space, a setpoint temperature of the conditioned space, and an operating mode of a variable-air-volume (VAV) box for the conditioned space; calculating a deviation from the setpoint temperature of the conditioned space for the VAV box for the conditioned space; calculating an average deviation from the setpoint temperature of the conditioned space; determining a discharge air setpoint temperature based on the average deviation from the setpoint temperature of the conditioned space; and setting the discharge air setpoint temperature of the HVACR unit using the determined discharge air setpoint temperature.

Aspect 2. The method of aspect 1, further comprising determining whether the operating mode of the VAV box matches an operating mode of an HVACR unit; and calculating the deviation from the setpoint temperature of the conditioned space for the VAV box for the conditioned space includes calculating the deviation from the setpoint temperature of the conditioned space when the operating mode of the VAV box matches the operating mode of the HVACR unit.

Aspect 3. The method of one of aspects 1 or 2, further comprising determining a second discharge air setpoint temperature based on a maximum humidity for the conditioned space, and setting the discharge air setpoint temperature to be the second discharge air setpoint temperature when the second discharge air setpoint temperature is less than the discharge air setpoint temperature based on the average deviation from the setpoint temperature of the conditioned space.

Aspect 4. The method of one of aspects 1-3, further comprising determining a humidity in the conditioned space, wherein in response to determining the humidity in the conditioned space is greater than or equal to a threshold humidity, the discharge air setpoint temperature is maintained at a default discharge air setpoint temperature.

Aspect 5. The method of one of aspects 1-4, wherein the discharge air setpoint temperature based on the average deviation from the setpoint temperature of the conditioned space varies linearly between a default discharge air setpoint temperature and a modified discharge air setpoint temperature.

Aspect 6. The method of aspect 5, wherein the default discharge air temperature is at or about 55° F. when the operating mode of the HVACR unit is a cooling mode.

Aspect 7. The method of aspect 5 or 6, wherein the modified discharge air setpoint temperature is at or about 65° F. when the operating mode of the HVACR unit is the cooling mode.

Aspect 8. The method of one of aspects 5-7, wherein the default discharge air temperature is at or about 105° F. when the operating mode of the HVACR unit is a heating mode.

Aspect 9. The method of aspect 5 or 8, wherein the modified discharge air setpoint temperature is at or about 80° F. when the operating mode of the HVACR unit is the heating mode.

Aspect 10. The method of one of aspects 1-9, wherein the average deviation from the setpoint temperature of the conditioned space is a mean calculation.

Aspect 11. A heating, ventilation, air conditioning, and refrigeration (HVACR) system, comprising: an HVACR unit operable in a heating mode and a cooling mode; a conditioned space; a variable-air-volume (VAV) box and a sensor; and a controller in electronic communication with the HVACR unit, the VAV box, and the sensor, the controller configured to: determine a space temperature in the conditioned space, a setpoint temperature of the conditioned space, and an operating mode of the VAV box; calculate a deviation from the setpoint temperature of the conditioned space for the VAV box; calculate an average deviation from the setpoint temperature of the conditioned space; determine a discharge air setpoint temperature based on the average deviation from the setpoint temperature of the conditioned space; and set the discharge air setpoint temperature of the HVACR unit using the determined discharge air setpoint temperature.

Aspect 12. The HVACR system of aspect 11, wherein the controller is further configured to determine whether the operating mode of the VAV box matches an operating mode of the HVACR unit; and calculate the deviation from the setpoint temperature of the conditioned space for the VAV box of the conditioned space includes calculating the deviation from the setpoint temperature of the conditioned space when the operating mode of the VAV box matches the operating mode of the HVACR unit.

Aspect 13. The HVACR system of one of aspects 11 or 12, wherein the controller is further configured to determine a second discharge air setpoint temperature based on a maximum humidity for the conditioned space, and set the discharge air setpoint temperature to be the second discharge air setpoint temperature when the second discharge air setpoint temperature is less than the discharge air setpoint temperature based on the average deviation from the setpoint temperature of the conditioned space.

Aspect 14. The HVACR system of one of aspects 11-13, wherein the controller is further configured to determine a humidity in the conditioned space, wherein in response to determining the humidity in the conditioned space is greater than or equal to a threshold humidity, the discharge air setpoint temperature is maintained at a default discharge air setpoint temperature.

Aspect 15. The HVACR system of one of aspects 11-14, wherein the discharge air setpoint temperature based on the average deviation from the setpoint temperature of the conditioned space varies linearly between a default discharge air setpoint temperature and a modified discharge air setpoint temperature.

Aspect 16. The HVACR system of aspect 15, wherein the default discharge air temperature is at or about 55° F. when the operating mode of the HVACR unit is a cooling mode.

Aspect 17. The HVACR system of aspect 15 or 16, wherein the modified discharge air setpoint temperature is at or about 65° F. when the operating mode of the HVACR unit is the cooling mode.

Aspect 18. The HVACR system of one of aspects 15-17, wherein the default discharge air temperature is at or about 105° F. when the operating mode of the HVACR unit is a heating mode.

Aspect 19. The HVACR system of one of aspects 15-18, wherein the modified discharge air setpoint temperature is at or about 105° F. when the operating mode of the HVACR unit is the heating mode.

Aspect 20. The HVACR system of one of aspects 11-19, wherein the average deviation from the setpoint temperature of the conditioned space is a mean calculation.

Aspect 21. A method of controlling a discharge air reset in a heating, ventilation, air conditioning, and refrigeration (HVACR) system, comprising: determining, by a controller, a space temperature in a conditioned space, a setpoint temperature of the conditioned space, and an operating mode of a variable-air-volume (VAV) box for the conditioned space; calculating a deviation from the setpoint temperature of the conditioned space for the VAV box for the conditioned space; calculating a maximum deviation from the setpoint temperature of the conditioned space; determining a discharge air setpoint temperature based on the maximum deviation from the setpoint temperature of the conditioned space; and setting the discharge air setpoint temperature of the HVACR unit using the determined discharge air setpoint temperature.

Aspect 22. The method of aspect 21, further comprising determining whether the operating mode of the VAV box matches an operating mode of an HVACR unit; and calculating the deviation from the setpoint temperature of the conditioned space for the VAV box for the conditioned space includes calculating the deviation from the setpoint temperature of the conditioned space when the operating mode of the VAV box matches the operating mode of the HVACR unit.

Aspect 23. The method of one of aspects 21 or 22, further comprising determining a second discharge air setpoint temperature based on a maximum humidity for the conditioned space, and setting the discharge air setpoint temperature to be the second discharge air setpoint temperature when the second discharge air setpoint temperature is less than the discharge air setpoint temperature based on the maximum deviation from the setpoint temperature of the conditioned space.

Aspect 24. The method of one of aspects 21-23, further comprising determining a humidity in the conditioned space, wherein in response to determining the humidity in the conditioned space is greater than or equal to a threshold humidity, the discharge air setpoint temperature is maintained at a default discharge air setpoint temperature.

Aspect 25. The method of one of aspects 21-24, wherein the discharge air setpoint temperature based on the maximum deviation from the setpoint temperature of the conditioned space varies linearly between a default discharge air setpoint temperature and a modified discharge air setpoint temperature.

Aspect 26. The method of aspect 25, wherein the default discharge air temperature is at or about 55° F. when the operating mode of the HVACR unit is a cooling mode.

Aspect 27. The method of aspect 25 or 26, wherein the modified discharge air setpoint temperature is at or about 65° F. when the operating mode of the HVACR unit is the cooling mode.

Aspect 28. The method of one of aspects 25-27, wherein the default discharge air temperature is at or about 105° F. when the operating mode of the HVACR unit is a heating mode.

Aspect 29. The method of aspect 25 or 28, wherein the modified discharge air setpoint temperature is at or about 80° F. when the operating mode of the HVACR unit is the heating mode.

Aspect 30. The method of one of aspects 21-29, wherein the maximum deviation from the setpoint temperature of the conditioned space is a relatively largest deviation from the setpoint temperature of the VAV box.

Aspect 31. A heating, ventilation, air conditioning, and refrigeration (HVACR) system, comprising: an HVACR unit operable in a heating mode and a cooling mode; a conditioned space; a variable-air-volume (VAV) box and a sensor; and a controller in electronic communication with the HVACR unit, the VAV box, and the sensor, the controller configured to: determine a space temperature in the conditioned space, a setpoint temperature of the conditioned space, and an operating mode of the VAV box; calculate a deviation from the setpoint temperature of the conditioned space for the VAV box; calculate a maximum deviation from the setpoint temperature of the conditioned space; determine a discharge air setpoint temperature based on the maximum deviation from the setpoint temperature of the conditioned space; and set the discharge air setpoint temperature of the HVACR unit using the determined discharge air setpoint temperature.

Aspect 32. The HVACR system of aspect 31, wherein the controller is further configured to determine whether the operating mode of the VAV box matches an operating mode of the HVACR unit; and calculate the deviation from the setpoint temperature of the conditioned space for the VAV box of the conditioned space includes calculating the deviation from the setpoint temperature of the conditioned space when the operating mode of the VAV box matches the operating mode of the HVACR unit.

Aspect 33. The HVACR system of one of aspects 31 or 32, wherein the controller is further configured to determine a second discharge air setpoint temperature based on a maximum humidity for the conditioned space, and set the discharge air setpoint temperature to be the second discharge air setpoint temperature when the second discharge air setpoint temperature is less than the discharge air setpoint temperature based on the maximum deviation from the setpoint temperature of the conditioned space.

Aspect 34. The HVACR system of one of aspects 31-33, wherein the controller is further configured to determine a humidity in the conditioned space, wherein in response to determining the humidity in the conditioned space is greater than or equal to a threshold humidity, the discharge air setpoint temperature is maintained at a default discharge air setpoint temperature.

Aspect 35. The HVACR system of one of aspects 31-34, wherein the discharge air setpoint temperature based on the maximum deviation from the setpoint temperature of the conditioned space varies linearly between a default discharge air setpoint temperature and a modified discharge air setpoint temperature.

Aspect 36. The HVACR system of aspect 35, wherein the default discharge air temperature is at or about 55° F. when the operating mode of the HVACR unit is a cooling mode.

Aspect 37. The HVACR system of aspect 35 or 36, wherein the modified discharge air setpoint temperature is at or about 65° F. when the operating mode of the HVACR unit is the cooling mode.

Aspect 38. The HVACR system of one of aspects 35-37, wherein the default discharge air temperature is at or about 105° F. when the operating mode of the HVACR unit is a heating mode.

Aspect 39. The HVACR system of one of aspects 35-38, wherein the modified discharge air setpoint temperature is at or about 105° F. when the operating mode of the HVACR unit is the heating mode.

Aspect 40. The HVACR system of one of aspects 31-39, wherein the maximum deviation from the setpoint temperature of the conditioned space is a relatively largest deviation from the setpoint temperature of the VAV box.

Aspect 41. A method of controlling a discharge air reset in a heating, ventilation, air conditioning, and refrigeration (HVACR) system, comprising: determining, by a controller, a space temperature in a conditioned space, a setpoint temperature of the conditioned space, and an operating mode of a variable-air-volume (VAV) box for the conditioned space; calculating a deviation from the setpoint temperature of the conditioned space for the VAV box for the conditioned space; calculating a statistical deviation from the setpoint temperature of the conditioned space; determining a discharge air setpoint temperature based on the statistical deviation from the setpoint temperature of the conditioned space; and setting the discharge air setpoint temperature of the HVACR unit using the determined discharge air setpoint temperature.

Aspect 42. The method of aspect 41, further comprising determining whether the operating mode of the VAV box matches an operating mode of an HVACR unit; and calculating the deviation from the setpoint temperature of the conditioned space for the VAV box for the conditioned space includes calculating the deviation from the setpoint temperature of the conditioned space when the operating mode of the VAV box matches the operating mode of the HVACR unit.

Aspect 43. The method of one of aspects 41 or 42, further comprising determining a second discharge air setpoint temperature based on a maximum humidity for the conditioned space, and setting the discharge air setpoint temperature to be the second discharge air setpoint temperature when the second discharge air setpoint temperature is less than the discharge air setpoint temperature based on the statistical deviation from the setpoint temperature of the conditioned space.

Aspect 44. The method of one of aspects 41-43, further comprising determining a humidity in the conditioned space, wherein in response to determining the humidity in the conditioned space is greater than or equal to a threshold humidity, the discharge air setpoint temperature is maintained at a default discharge air setpoint temperature.

Aspect 45. The method of one of aspects 41-44, wherein the discharge air setpoint temperature based on the statistical deviation from the setpoint temperature of the conditioned space varies linearly between a default discharge air setpoint temperature and a modified discharge air setpoint temperature.

Aspect 46. The method of aspect 45, wherein the default discharge air temperature is at or about 55° F. when the operating mode of the HVACR unit is a cooling mode.

Aspect 47. The method of aspect 46, wherein the modified discharge air setpoint temperature is at or about 65° F. when the operating mode of the HVACR unit is the cooling mode.

Aspect 48. The method of one of one of aspects 45-47, wherein the default discharge air temperature is at or about 105° F. when the operating mode of the HVACR unit is a heating mode.

Aspect 49. The method of aspect 48, wherein the modified discharge air setpoint temperature is at or about 80° F. when the operating mode of the HVACR unit is the heating mode.

Aspect 50. The method of one of aspects 41-49, wherein the statistical deviation from the setpoint temperature of the conditioned space is an average calculation or a maximum calculation.

Aspect 51. A heating, ventilation, air conditioning, and refrigeration (HVACR) system, comprising: an HVACR unit operable in a heating mode and a cooling mode; a conditioned space; a variable-air-volume (VAV) box and a sensor; and a controller in electronic communication with the HVACR unit, the VAV box, and the sensor, the controller configured to: determine a space temperature in the conditioned space, a setpoint temperature of the conditioned space, and an operating mode of the VAV box; calculate a deviation from the setpoint temperature of the conditioned space for the VAV box; calculate a statistical deviation from the setpoint temperature of the conditioned space; determine a discharge air setpoint temperature based on the statistical deviation from the setpoint temperature of the conditioned space; and set the discharge air setpoint temperature of the HVACR unit using the determined discharge air setpoint temperature.

Aspect 52. The HVACR system of aspect 51, wherein the controller is further configured to determine whether the operating mode of the VAV box matches an operating mode of the HVACR unit; and calculate the deviation from the setpoint temperature of the conditioned space for the VAV box of the conditioned space includes calculating the deviation from the setpoint temperature of the conditioned space when the operating mode of the VAV box matches the operating mode of the HVACR unit.

Aspect 53. The HVACR system of one of aspects 51 or 52, wherein the controller is further configured to determine a second discharge air setpoint temperature based on a maximum humidity for the conditioned space, and set the discharge air setpoint temperature to be the second discharge air setpoint temperature when the second discharge air setpoint temperature is less than the discharge air setpoint temperature based on the statistical deviation from the setpoint temperature of the conditioned space.

Aspect 54. The HVACR system of one of aspects 51-53, wherein the controller is further configured to determine a humidity in the conditioned space, wherein in response to determining the humidity in the conditioned space is greater than or equal to a threshold humidity, the discharge air setpoint temperature is maintained at a default discharge air setpoint temperature.

Aspect 55. The HVACR system of one of aspects 51-54, wherein the discharge air setpoint temperature based on the statistical deviation from the setpoint temperature of the conditioned space varies linearly between a default discharge air setpoint temperature and a modified discharge air setpoint temperature.

Aspect 56. The HVACR system of aspect 55, wherein the default discharge air temperature is at or about 55° F. when the operating mode of the HVACR unit is a cooling mode.

Aspect 57. The HVACR system of aspect 56, wherein the modified discharge air setpoint temperature is at or about 65° F. when the operating mode of the HVACR unit is the cooling mode.

Aspect 58. The HVACR system of one of aspects 55-57, wherein the default discharge air temperature is at or about 105° F. when the operating mode of the HVACR unit is a heating mode.

Aspect 59. The HVACR system of aspect 58, wherein the modified discharge air setpoint temperature is at or about 105° F. when the operating mode of the HVACR unit is the heating mode.

Aspect 60. The HVACR system of one of aspects 51-59, wherein the statistical deviation from the setpoint temperature of the conditioned space is an average calculation or a maximum calculation.

The terminology used in this specification is intended to describe particular embodiments and is not intended to be limiting. The terms "a," "an," and "the" include the plural forms as well, unless clearly indicated otherwise. The terms "comprises" and/or "comprising," when used in this specification, specify the presence of the stated features, integers, steps, operations, elements, and/or components, but do not preclude the presence or addition of one or more other features, integers, steps, operations, elements, and/or components.

With regard to the preceding description, it is to be understood that changes may be made in detail, especially in matters of the construction materials employed and the shape, size, and arrangement of parts without departing from the scope of the present disclosure. This specification and the embodiments described are exemplary only, with the true scope and spirit of the disclosure being indicated by the claims that follow.

What is claimed is:

1. A method of controlling a discharge air reset in a heating, ventilation, air conditioning, and refrigeration (HVACR) system, comprising:
  determining, by a controller, a space temperature in a conditioned space, a setpoint temperature of the conditioned space, and an operating mode of a variable-air-volume (VAV) box for the conditioned space;
  calculating a deviation from the setpoint temperature of the conditioned space for the VAV box for the conditioned space;
  calculating a statistical deviation from the setpoint temperature of the conditioned space;
  determining a discharge air setpoint temperature based on the statistical deviation from the setpoint temperature of the conditioned space; and
  setting a discharge air setpoint temperature of an HVACR unit using the determined discharge air setpoint temperature.

2. The method of claim 1, further comprising:
determining whether the operating mode of the VAV box for the conditioned space matches an operating mode of the HVACR unit; and
when the operating mode of the VAV box for the conditioned space matches the operating mode of the HVACR unit, calculating the deviation from the setpoint temperature of the conditioned space for the VAV box for the conditioned space.

3. The method of claim 1, further comprising:
determining a second discharge air setpoint temperature based on a maximum humidity for the conditioned space, and
setting the discharge air setpoint temperature of the HVACR unit to be the determined second discharge air setpoint temperature when the determined second discharge air setpoint temperature is less than the determined discharge air setpoint temperature.

4. The method of claim 1, further comprising:
determining a humidity in the conditioned space, and
maintaining the discharge air setpoint temperature of the HVACR unit at a default discharge air setpoint temperature when the determined humidity in the conditioned space is greater than or equal to a threshold humidity.

5. The method of claim 1, wherein the determined discharge air setpoint temperature varies linearly between a default discharge air setpoint temperature and a modified discharge air setpoint temperature.

6. The method of claim 5, wherein the default discharge air temperature is at or about 55° F. when the operating mode of the HVACR unit is a cooling mode.

7. The method of claim 6, wherein the modified discharge air setpoint temperature is at or about 65° F. when the operating mode of the HVACR unit is the cooling mode.

8. The method of claim 5, wherein the default discharge air temperature is at or about 105° F. when the operating mode of the HVACR unit is a heating mode.

9. The method of claim 8, wherein the modified discharge air setpoint temperature is at or about 80° F. when the operating mode of the HVACR unit is the heating mode.

10. The method of claim 1, wherein the statistical deviation from the setpoint temperature of the conditioned space is an average calculation or a maximum calculation.

11. A heating, ventilation, air conditioning, and refrigeration (HVACR) system, comprising:
an HVACR unit operable in a heating mode and a cooling mode;
a conditioned space;
a variable-air-volume (VAV) box and a sensor; and
a controller in electronic communication with the HVACR unit, the VAV box, and the sensor, the controller configured to:
determine a space temperature in the conditioned space, a setpoint temperature of the conditioned space, and an operating mode of the VAV box;
calculate a deviation from the setpoint temperature of the conditioned space for the VAV box;
calculate a statistical deviation from the setpoint temperature of the conditioned space;
determine a discharge air setpoint temperature based on the statistical deviation from the setpoint temperature of the conditioned space; and
set a discharge air setpoint temperature of the HVACR unit using the determined discharge air setpoint temperature.

12. The HVACR system of claim 11, wherein the controller is further configured to:
determine whether the operating mode of the VAV box matches an operating mode of the HVACR unit; and
when the operating mode of the VAV box matches the operating mode of the HVACR unit, calculate the deviation from the setpoint temperature of the conditioned space for the VAV box.

13. The HVACR system of claim 11, wherein the controller is further configured to:
determine a second discharge air setpoint temperature based on a maximum humidity for the conditioned space, and
set the discharge air setpoint temperature of the HVACR unit to be the determined second discharge air setpoint temperature when the determined second discharge air setpoint temperature is less than the determined discharge air setpoint temperature.

14. The HVACR system of claim 11, wherein the controller is further configured to:
determine a humidity in the conditioned space, and
maintain the discharge air setpoint temperature of the HVACR unit at a default discharge air setpoint temperature when the determined humidity in the conditioned space is greater than or equal to a threshold humidity.

15. The HVACR system of claim 11, wherein the determined discharge air setpoint temperature varies linearly between a default discharge air setpoint temperature and a modified discharge air setpoint temperature.

16. The HVACR system of claim 15, wherein the default discharge air temperature is at or about 55° F. when the operating mode of the HVACR unit is a cooling mode.

17. The HVACR system of claim 16, wherein the modified discharge air setpoint temperature is at or about 65° F. when the operating mode of the HVACR unit is the cooling mode.

18. The HVACR system of claim 15, wherein the default discharge air temperature is at or about 105° F. when the operating mode of the HVACR unit is a heating mode.

19. The HVACR system of claim 18, wherein the modified discharge air setpoint temperature is at or about 80° F. when the operating mode of the HVACR unit is the heating mode.

20. The HVACR system of claim 11, wherein the statistical deviation from the setpoint temperature of the conditioned space is an average calculation or a maximum calculation.

* * * * *